United States Patent
Adachi et al.

(10) Patent No.: US 12,460,935 B2
(45) Date of Patent: Nov. 4, 2025

(54) INFORMATION PRESENTING DEVICE, INFORMATION PRESENTING METHOD, AND INFORMATION PRESENTING PROGRAM

(71) Applicant: NTT, INC.

(72) Inventors: Takayuki Adachi, Tokyo (JP); Shinya Oi, Tokyo (JP); Akira Nakayama, Tokyo (JP); Masaru Miyamoto, Tokyo (JP)

(73) Assignee: NTT, INC., Tokyo (JP)

( * ) Notice: Subject to any disclaimer, the term of this patent is extended or adjusted under 35 U.S.C. 154(b) by 771 days.

(21) Appl. No.: 17/641,065

(22) PCT Filed: Sep. 9, 2019

(86) PCT No.: PCT/JP2019/035359
§ 371 (c)(1),
(2) Date: Mar. 7, 2022

(87) PCT Pub. No.: WO2021/048896
PCT Pub. Date: Mar. 18, 2021

(65) Prior Publication Data
US 2022/0333935 A1    Oct. 20, 2022

(51) Int. Cl.
*G01C 21/34* (2006.01)
*G06Q 10/04* (2023.01)
*G06Q 10/047* (2023.01)
*G06Q 50/40* (2024.01)

(52) U.S. Cl.
CPC ......... *G01C 21/3423* (2013.01); *G06Q 10/04* (2013.01); *G06Q 10/047* (2013.01); *G06Q 50/40* (2024.01)

(58) Field of Classification Search
CPC .... G01C 21/3423; G06Q 50/40; G06Q 10/04; G06Q 10/047
USPC .......................................................... 705/5
See application file for complete search history.

(56) References Cited

U.S. PATENT DOCUMENTS

2018/0224288 A1    8/2018    Fujita et al.

FOREIGN PATENT DOCUMENTS

| JP | 2008102046 A | | 5/2008 | |
|----|--------------|---|--------|---|
| JP | 2015219673 A | * | 12/2015 | |
| JP | 2015227852 A | | 12/2015 | |
| JP | 6504259 B2 | | 4/2019 | |
| WO | WO-2017056528 A1 | * | 4/2017 | ......... G06Q 10/0631 |

OTHER PUBLICATIONS

"A fixed-grid model for simulation of a moving body in free surface flows" Published by Elsevier (Year: 2007).*

* cited by examiner

Primary Examiner — Zeina Elchanti

(57) ABSTRACT

An information provision device includes: a simulation execution unit that executes a simulation of a movement of moving bodies on multiple routes from a point of departure to a destination on a basis of setting data that accounts for different means of transportation; a simulation result analysis unit that obtains, as a simulation result, information related to a number and a density of the moving bodies on each of the routes from the point of departure to the destination on a basis of a result of the simulation execution unit executing the simulation; and an information provision unit that provides information based on the simulation result obtained by the simulation result analysis unit.

20 Claims, 7 Drawing Sheets

Fig. 10

|  | TIME PERIOD | |
|---|---|---|
| | 1 2 3 4 5 6 7 8 9 10 11 12 13 14 ··· | |
| r1 | 10 20 ···. | (1) WALKING (OUTDOORS) |
| r2 | ···. | |
| r3 | | |
| ··· | | |
| r4 | ··· | (2) WALKING (STATION) |
| r5 | | |
| ··· | | |
| r6 | ··· | (3) TRAIN |
| ··· | | |
| r7 | ··· | (4) WALKING (STATION) |
| r8 | | |
| r9 | | |
| ··· | | |
| r10 | ··· | (5) WALKING (OUTDOORS) |
| ··· | | |

(ROAD on vertical axis)

INFORMATION PRESENTING DEVICE, INFORMATION PRESENTING METHOD, AND INFORMATION PRESENTING PROGRAM

CROSS-REFERENCE TO RELATED APPLICATIONS

This application is a U.S. National Stage Application filed under 35 U.S.C. § 371 claiming priority to International Patent Application No. PCT/JP2019/035359, filed on 9 Sep. 2019, the disclosure of which is hereby incorporated herein by reference in its entirety.

TECHNICAL FIELD

The disclosed technology relates to an information provision device, an information provision method, and an information provision program.

BACKGROUND ART

At large-scale event venues where large numbers of visitors are anticipated, such as concerts, sports competitions, and fireworks displays, many participants may become concentrated around the venue, and crowding may occur near the venue while the event is taking place. Accordingly, it is important for event organizers to ascertain conditions while the event is taking place and also before and after the event takes place, and establish countermeasures for alleviating crowding, either directly or indirectly. For example, a conceivable situation is that many people will move between the venue and a train station when entering or leaving the event. In such situations, it is important to ascertain the movement of people and adopt appropriate countermeasures for alleviating crowding, such as regulations on entering, leaving, and moving.

One technology of the related art is a method that presents choices of actions on the basis of information about a movement route from a point of departure to a destination. The method calculates a level of satisfaction with respect to the choices of actions from the wait times until the movement route is available and the crowding conditions on the movement route, and displays choices with high levels of satisfaction. In addition, the method also displays choices of actions with incentives for places that can be visited during the wait times in addition to the levels of satisfaction (see Patent Literature 1).

CITATION LIST

Patent Literature

Patent Literature 1: Japanese Patent No. 6504259

SUMMARY OF THE INVENTION

Technical Problem

With the technology disclosed in Patent Literature 1 above, the movement routes are limited to only a single means of transportation. For example, in the case of considering a movement route in which a pedestrian walks from a point of departure to a train station, passes through the ticket gate, proceeds to the train platform, and then boards a train, the technology disclosed in Patent Literature 1 above cannot present information that accounts for not only walking but also trains as the means of transportation. Additionally, the technology disclosed in Patent Literature 1 above is limited to the wait times before using a means of transportation at the point of departure, and the incentives to be displayed are also limited in association with these wait times.

The technology disclosed herein has been devised in light of the above points, and an object is to provide an information provision device, an information provision method, and an information provision program that considers multiple means of transportation consistently, analyzes not only the wait times until departure but also conditions where crowding occurs, and provides information effective for alleviating crowding according to the conditions.

Means for Solving the Problem

A first aspect of the present disclosure is an information provision device including: a simulation execution unit that executes a simulation of a movement of moving bodies on multiple routes from a point of departure to a destination on a basis of setting data that accounts for different means of transportation; a simulation result analysis unit that obtains, as a simulation result, information related to a number and a density of the moving bodies on each of the routes from the point of departure to the destination on a basis of a result of the simulation execution unit executing the simulation; and an information provision unit that provides information based on the simulation result obtained by the simulation result analysis unit.

A second aspect of the present disclosure is an information provision method executed by a computer, the method including: executing a simulation of a movement of moving bodies on multiple routes from a point of departure to a destination on a basis of setting data that accounts for different means of transportation; obtaining, as a simulation result, information related to a number and a density of the moving bodies on each of the routes from the point of departure to the destination on a basis of a result of executing the simulation; and providing information based on the obtained simulation result.

A third aspect of the present disclosure is an information processing program causing a computer to execute a process including: executing a simulation of a movement of moving bodies on multiple routes from a point of departure to a destination on a basis of setting data that accounts for different means of transportation; obtaining, as a simulation result, information related to a number and a density of the moving bodies on each of the routes from the point of departure to the destination on a basis of a result of executing the simulation; and providing information based on the obtained simulation result.

Effects of the Invention

According to the technology disclosed herein, multiple means of transportation can be considered consistently, not only the wait times until departure but also conditions where crowding occurs can be analyzed, and information effective for alleviating crowding according to the conditions can be provided.

BRIEF DESCRIPTION OF DRAWINGS

FIG. 10 is a diagram illustrating an outline of a population density table.

DESCRIPTION OF EMBODIMENTS

Figure 1:
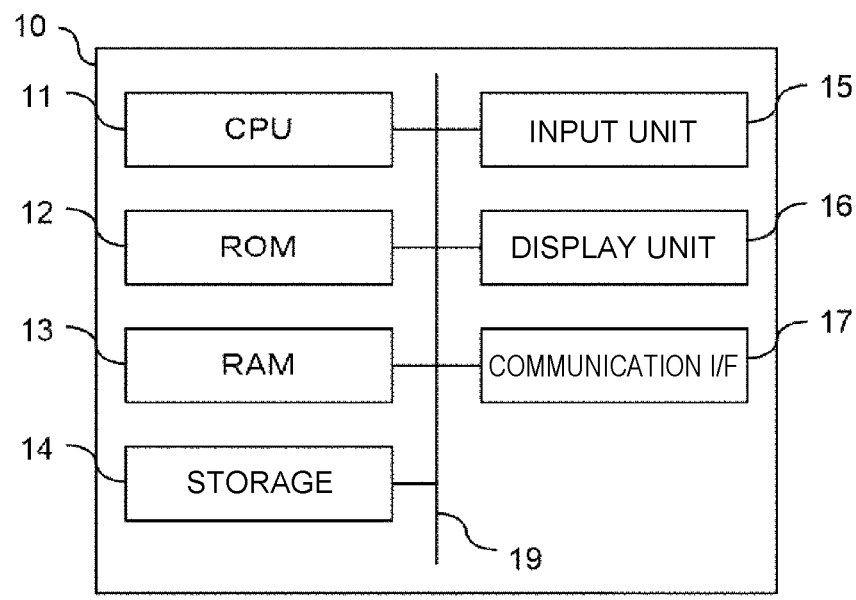
FIG. 1 is a block diagram illustrating a hardware configuration of an information provision device according to the present embodiment.

Hereinafter, one example of an embodiment of the technology disclosed herein will be described with reference to the drawings. Note that in each of the drawings, the same or equivalent structural elements and portions are denoted with the same reference signs. Also, the dimensional ratios in the drawings are exaggerated for convenience of explanation, and may differ from the actual ratios in some cases.

FIG. 1 is a block diagram illustrating a hardware configuration of an information provision device 10.

As illustrated in FIG. 1, the information provision device 10 includes a central processing unit (CPU) 11, read-only memory (ROM) 12, random access memory (RAM) 13, storage 14, an input unit 15, a display unit 16, and a communication interface (I/F) 17. The components are communicably interconnected through a bus 19.

The CPU 11 is a central processing unit that executes various programs and controls each component. In other words, the CPU 11 reads out a program from the ROM 12 or the storage 14, and executes the program by using the RAM 13 as a work area. The CPU 11 controls each of the above components and performs various computational processes by following a program stored in the ROM 12 or the storage 14. In the present embodiment, an information provision program executes a simulation of the movement of moving bodies such as people and provides information based on the simulation result is stored in the ROM 12 or the storage 14.

The ROM 12 stores various programs and various data. The RAM 13 stores programs or data temporarily as a work area. The storage 14 includes a hard disk drive (HDD) or a solid-state drive (SSD), and stores various programs and various data including an operating system.

The input unit 15 includes a pointing device such as a mouse and a keyboard, and is used to provide various types of input.

The display unit 16 is a liquid crystal display, for example, and displays various information. The display unit 16 may also adopt a touch panel configuration and function as the input unit 15.

The communication interface 17 is an interface for communicating with other equipment, and a standard such as Ethernet(R), FDDI, or Wi-Fi(R) is used, for example.

Next, a functional configuration of the information provision device 10 will be described.

Figure 2:
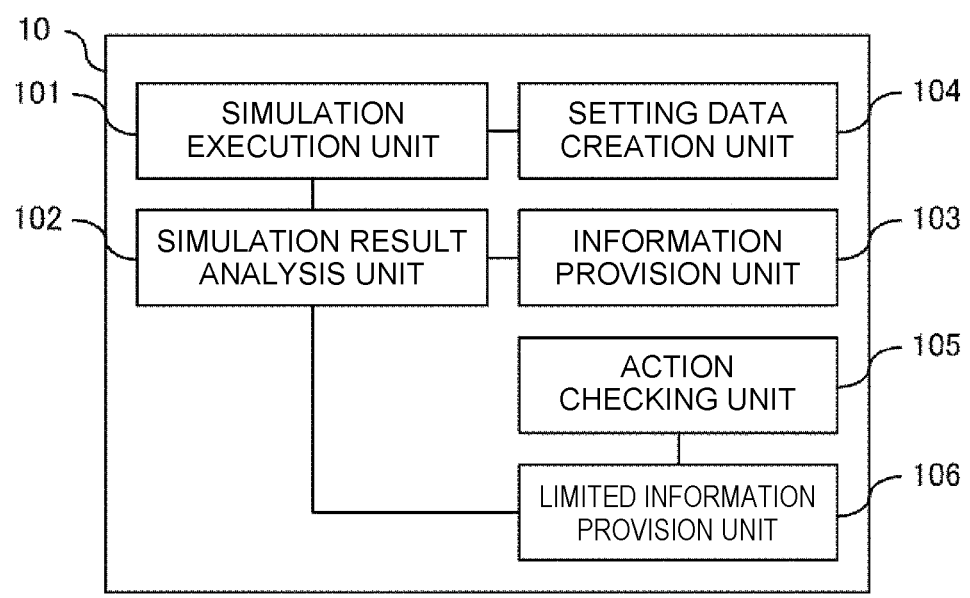
FIG. 2 is a block diagram illustrating an example of a functional configuration of the information provision device.

FIG. 2 is a block diagram illustrating an example of a functional configuration of the information provision device 10.

As illustrated in FIG. 2, the information provision device 10 includes a simulation execution unit 101, a simulation result analysis unit 102, an information provision unit 103, a setting data creation unit 104, an action checking unit 105, and a limited information provision unit 106 as a functional configuration. Each functional component is achieved by causing the CPU 11 to read out and load an information provision program stored in the ROM 12 or the storage 14 into the RAM 13, and execute the program.

The simulation execution unit 101 executes a simulation of the movement of moving bodies on multiple routes from a point of departure (start point) to a destination (goal point) in any given area, the simulation being executed on the basis of setting data that accounts for different means of transportation. In the present embodiment, the simulation execution unit 101 executes a simulation of the movement of pedestrians as the moving bodies. The simulation executed by the simulation execution unit 101 is not limited to a specific method. For example, the simulation execution unit 101 may execute the simulation of the movement of moving bodies by using the simulation method disclosed in Reference Literature 1 below.

Reference Literature 1: Junji In-nami, Takayoshi Shogaki, Fumihiko Kakehi, Kiyoshi Fukui, and Takeshi Yamada, "Pedestrian Simulation Study to Evaluate the Effect of Evacuation Guidance Around the Large-scale Terminal Station", Infrastructure planning review (in Japanese), Vol. 45, pp. 8 (2012).

Figure 3:
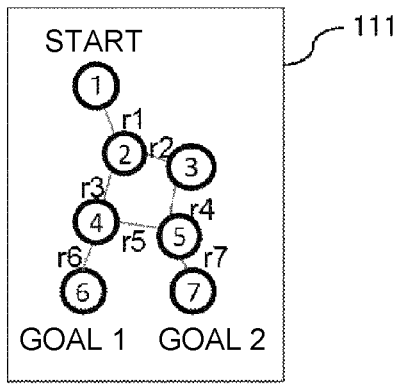
FIG. 3 is a diagram for explaining setting data used when a simulation execution unit executes a simulation.
Figure 3:
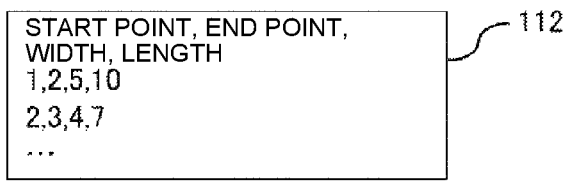
Figure 3:
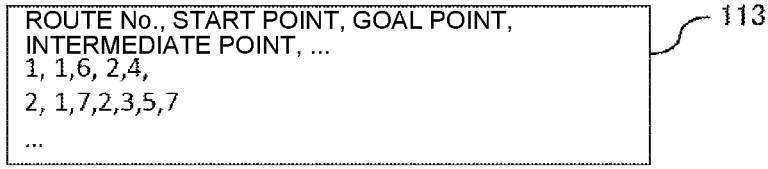
Figure 3:
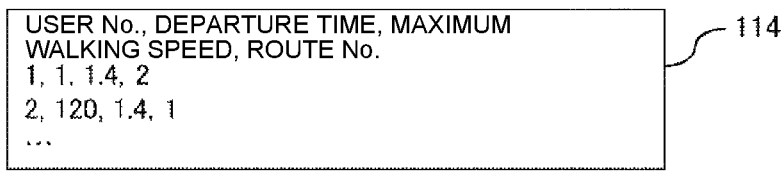
Figure 3:
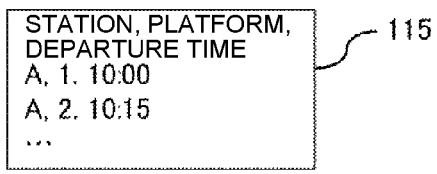
Figure 3:
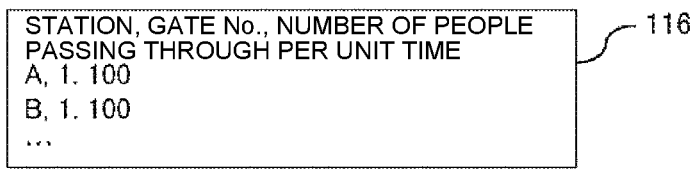

The simulation execution unit 101 executes the simulation of the movement of moving bodies on multiple routes from a point of departure (start point) to a destination (goal point) on the basis of setting data that accounts for different means of transportation prepared in advance. FIG. 3 is a diagram for explaining setting data used when the simulation execution unit 101 executes the simulation.

The simulation execution unit 101 uses road system information 112 generated from a graph 111 containing nodes (points) and edges (roads). The road system information 112 includes information indicating a start point and an end point of each edge, and the width and length of each edge.

In addition, the simulation execution unit 101 executes the simulation of the movement of moving bodies using route information 113 from a start point to a goal point. The route information 113 includes information about a start point, a goal point, and points between the start point and the goal point. For example, the first row illustrates that the start point is the number 1, the goal point is the number 6, and points between the start point and the goal point are the numbers 2 and 4. Even if the start point and the goal point are the same, different routes exists depending on differences in the intermediate points. In the case where the start point is the number 1 and the goal point is the number 7, a route passing through the numbers 2, 4, and 5 and a route passing through the numbers 2, 3, and 5 as the points between the start point and the goal point exist.

In addition, the simulation execution unit 101 executes the simulation of the movement of moving bodies using pedestrian information 114 containing a movement start time, a maximum movement speed, and the above route information for each pedestrian. Also, the simulation execution unit 101 executes the simulation of the movement of moving bodies using information necessary to reproduce different means of transportation. The information used as the information necessary to reproduce different means of transportation may be, for example, train service planning diagram information 115 that accounts for movement by train as a means of transportation different from walking, and headcount information 116 indicating the number of people who can pass through the ticket gate of a train station per unit time.

In this way, by preparing information related to different means of transportation, such as walking and movement by train, as the setting data, the simulation execution unit 101 is capable of executing a simulation that considers multiple means of transportation consistently.

The simulation execution unit 101 may also obtain the position of each user at discrete times on the basis of the pedestrian information 114 by starting at the start point of the route information 113 for each pedestrian at the movement start time, and calculating movement passing through intermediate points toward the goal at discrete times. For example, the simulation execution unit 101 may imitate actual walking by starting at a value obtained by multiplying the maximum walking speed of a pedestrian by a predetermined coefficient greater than 0 and less than 1, and lowering the walking speed of each pedestrian according to the degree to which free walking is impeded by the presence of persons ahead.

The simulation result analysis unit 102 obtains, as a simulation result, information related to the number and density of moving bodies on each route from a point of departure to a destination on the basis of the result of executing the simulation by the simulation execution unit 101.

The information provision unit 103 provides information based on the simulation result obtained by the simulation result analysis unit 102. The information provided by the information provision unit 103 may be visual information, for example. The information provision unit 103 may also provide visual information based on the simulation result to a terminal used by an organizer of an event to be held in the area that is the subject of the simulation, for example. Also, the information provision unit 103 may provide visual information based on the simulation result to a terminal used by a participant who participates in an event to be held in the area that is the subject of the simulation, for example. A terminal provided with visual information from the information provision unit 103 displays information based on the provided information. The information provided by the information provision unit 103 may be auditory information, for example. The information provision unit 103 may also provide auditory information based on the simulation result to a terminal used by an organizer of an event to be held in the area that is the subject of the simulation, for example. Also, the information provision unit 103 may provide auditory information based on the simulation result to a terminal used by a participant who participates in an event to be held in the area that is the subject of the simulation, for example. A terminal provided with auditory information from the information provision unit 103 outputs sound information based on the provided information.

Figure 4:
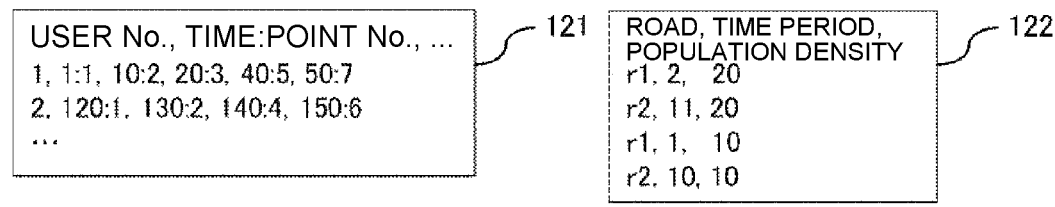
FIG. 4 is a diagram for explaining a simulation result obtained by a simulation result analysis unit and information provided by an information provision unit.
Figure 4:
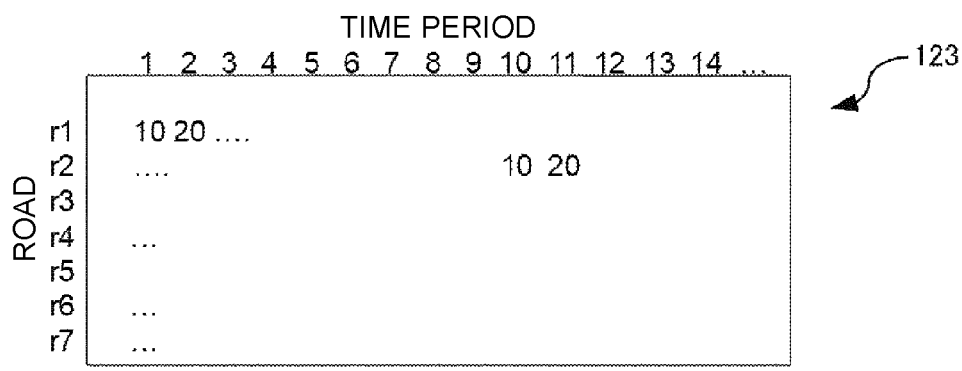
Figure 4:
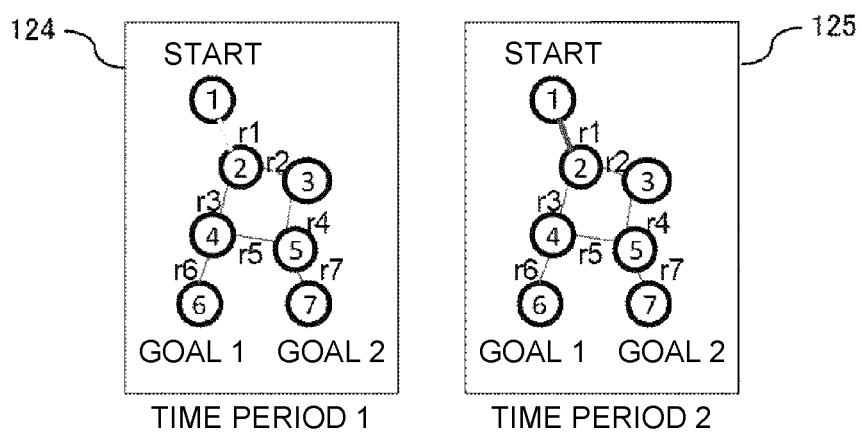
Figure 4:
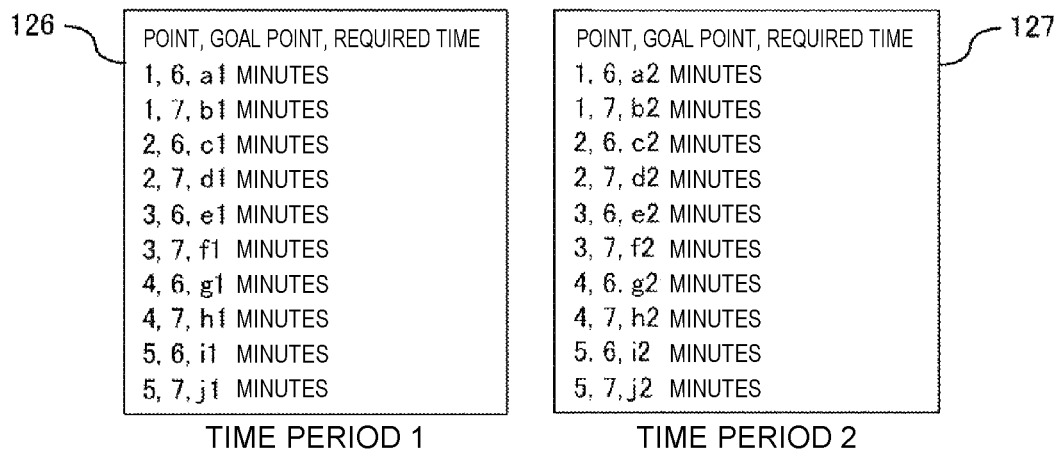

FIG. 4 is a diagram for explaining the simulation result obtained by the simulation result analysis unit 102 and the information provided by the information provision unit 103.

For example, the simulation result analysis unit 102 creates a population density table 122 containing information about the number of people and population density at discrete times and on each route, on the basis of movement information 121 for all pedestrians obtained as a result of the simulation execution unit 101 executing the simulation. The content of the movement information 121 will be described. The simulation result indicates that a pedestrian with a user number 1 on the first row of the movement information 121 is at a point 1 at a time 1, and then moves to a point 2 at a time 10, to a point 3 at a time 20, to a point 5 at a time 40, and to a point 7 at a time 50.

Additionally, the information provision unit 103 creates a population density list 123 obtained by extracting places and time periods having a high population density. The time periods may be of any width. For example, the information provision unit 103 may set the width of each time period to 1 minute. In addition, the information provision unit 103 creates maps 124 and 125 in which colors are applied according to the population density on a graph containing nodes and edges, to visually indicate the places where the population density is high. The CPU 11 creates the maps 124 and 125 from the population density table 122 and the population density list 123. In the example illustrated in FIG. 4, the map 124 illustrates a route r1 between the point 1 and the point 2 at a certain time period 1 with a specific color such as yellow, for example. By illustrating the route r1 in yellow, the map 124 indicates that there is a medium population density on the route r1. Also, the map 125 illustrates the route r1 between the point 1 and the point 2 at a certain time period 2 with a different specific color such as red, for example. By illustrating the route r1 in red, the map 125 indicates that there is a high population density on the route r1. Note that the CPU 11 may also express differences in the population density on the map with differences in line thickness instead of, or in addition to, color differences. Note that FIG. 4 illustrates maps only for the time period 1 and the time period 2 for convenience, but in actuality, the CPU 11 creates similar maps for all time periods of interest.

In addition, the information provision unit 103 may also provide information about the number of people in a place during a time period of high population density. Also, the information provision unit 103 may provide the population density table 122 and the population density list 123 directly as the information.

Furthermore, the information provision unit 103 may indicate methods of taking a detour around a place during a time period of high population density, and provide incentive information encouraging each pedestrian to take some kind of detour. For example, the information provision unit 103 may provide information stating that "Because route r1 at time 2 has a high population density, delaying the start of your walk is recommended (users seeing this information will be awarded n points)". Also, the information provision unit 103 may hold a lottery for awarding points to pedestrians, and points may be awarded by lottery according to the ratio of the number of people for lowering the population density.

In addition, the information provision unit 103 may use information such as the number of people and the population density to calculate the required time to the goal from each point in each time period. Thereafter, the information provision unit 103 may provide required time information 126 and 127 indicating the calculated required times. The required time information 126 indicates information about the required times in a certain time period 1. The required time information 127 indicates information about the required times in a certain time period 2. In FIG. 4, the required times are expressed as variables such as a1 and b1 for convenience, but in actuality, the required time values are expressed as specific numerical values. Note that FIG. 4 illustrates the required time information only for the time period 1 and the time period 2 for convenience, but in actuality, the CPU 11 creates similar required time information for all time periods of interest.

The setting data creation unit 104 creates setting data in accordance with information related to the conditions of moving bodies measured in the past on each route. The information related to the conditions of moving bodies may be collected by various types of sensors provided on the moving bodies or carried by the moving bodies, for example. In the case where the moving bodies are pedestrians, the setting data creation unit 104 uses position information sensors and other types of sensors to acquire and accumulate the number of people staying at a certain point at a certain time and the number of people passing through a certain point at a certain time with respect to pedestrians who have walked for a similar purpose in the past, for example. Additionally, the setting data creation unit 104 uses the accumulated data to create start times of pedestrians from multiple start points and movement routes from the multiple start points to multiple goal points such that the pedestrians meet at the certain point at the certain time as pedestrian information. Consequently, the setting data creation unit 104 may also create the pedestrian information 114 as the setting data.

For example, the setting data creation unit 104 may use the technology disclosed in Reference Literature 2 to estimate the number of people on each route to match the measured data collected by sensors and the like.

Reference Literature 2: Hitoshi Shimizu, Tatsushi Matsubayashi, Yusuke Tanaka, Tomoharu Iwata, and Hiroshi Sawada, "Route Traffic Flow Estimation by Observing Staying People", Annual Conference of the Japanese Society for Artificial Intelligence, 1B1-OS-11a-04 (2018).

Additionally, the setting data creation unit 104 converts information about the number of people who moved on a certain route in a certain time period to information indicating how many people on average start moving from the start point on the route in a certain time period. If the setting data creation unit 104 is capable of making such a conversion, the pedestrian information 114 illustrated in FIG. 3 can be created on the basis of the measured data collected by sensors and the like. Note that the maximum walking speed used when the setting data creation unit 104 creates the pedestrian information 114 may be set by a method such as multiplying by a coefficient obtained by modifying a predetermined constant with a random number.

Thereafter, the simulation execution unit 101 may execute the simulation using the pedestrian information 114 created by the setting data creation unit 104. By causing the simulation execution unit 101 to execute the simulation using the pedestrian information 114 created by the setting data creation unit 104, the information provision device 100 can obtain a simulation result that is consistent with measured data for pedestrians who have walked for a similar purpose in the past.

The setting data creation unit 104 may also create setting data using measured data obtained by partially updating measured data from the past with the latest measured data acquired continually. With this arrangement, the setting data creation unit 104 is capable of creating setting data that reflects the latest measured data.

The action checking unit 105 may also acquire and accumulate an action history from limited users who have consented in advance to provide the action history, the action history of the limited users being measured continuously using various types of sensors. The limited users are an example of a limited moving body in the technology disclosed herein. From the action history of the limited users accumulated by the action checking unit 105, the limited information provision unit 106 obtains users having a high likelihood of being present at times and places where crowding is predicted to occur according to the analysis by the simulation result analysis unit 102. Thereafter, the limited information provision unit 106 provides limited information to the users having a high likelihood of being present at times and places where crowding is predicted to occur from among the limited users. The limited information may include information about the times and places where crowding is predicted to occur, information requesting cooperation to avoid crowding, and the like. The limited information provision unit 106 may also obtain the probability that a limited user will be present at times and places where crowding is predicted to occur, on the basis of the action history and the action histories of other users. The limited information provision unit 106 may also obtain the probability that limited users will be present at times and places where crowding is predicted to occur, on the basis of which places on which routes the limited users will be in at the next time according to the road length from the current location.

Next, the operations of the information provision device 10 will be described.

First Example

Figure 5:
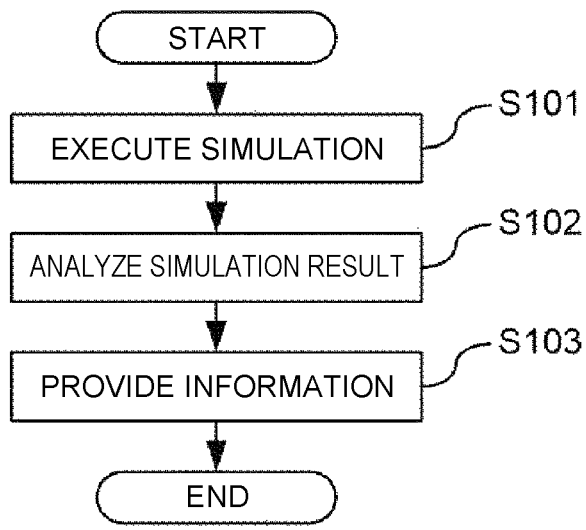
FIG. 5 is a flowchart illustrating a flow of an information provision process by the information provision device.

FIG. 5 is a flowchart illustrating a flow of an information provision process by the information provision device 10. The information provision process is performed by causing the CPU 11 to read out an information provision program from the ROM 12 or the storage 14, load the program into the RAM 13, and execute the program.

In step S101, the CPU 11 executes a simulation of the movement of moving bodies on the basis of setting data prepared in advance (step S101). As described above, the CPU 11 uses the road system information 112, the route information 113, the pedestrian information 114, the train service planning diagram information 115, and the headcount information 116 illustrated in FIG. 3 as the setting data.

After step S101, the CPU 11 analyzes the result of executing the simulation (step S102). As a result of executing the simulation, the CPU 11 obtains information related to the number and density of moving bodies on each route from a point of departure to a destination. As described above, the CPU 11 creates the population density table 122 containing information about the number of people and population density at discrete times and on each route from the movement information 121 for all pedestrians obtained as a result of executing the simulation.

After step S102, the CPU 11 provides information based on the simulation result (step S103). The CPU 11 may cause the display unit 16 to display information based on the simulation result, and may also transmit information based on the simulation result to another device through the communication interface 17. In the case where the information based on the simulation result is visual information, the CPU 11 may provide the population density list 123, the maps 124 and 125, and the required time information 126 and 127 illustrated in FIG. 4 as described above as the visual information. Note that although the map 124 and the required time information 126 are results for a certain time period 1 while the map 125 and the required time information 127 are results for a certain time period 2 for convenience, the CPU 11 is capable of providing similar maps and required time information for all time periods of interest. Furthermore, the CPU 11 may indicate methods of taking a detour around a place during a time period of high population density, and provide incentive information encouraging each pedestrian to take some kind of detour. By indicating methods of taking a detour around a place during a time period of high population density, the CPU 11 may also encourage the organizer of an event to be held in the area that is the subject of the simulation to take countermeasures for causing pedestrians to avoid crowding.

By executing the series of operations illustrated in FIG. 5, the information provision device 10 is capable of providing each pedestrian, the event organizer, or the like with information effective for alleviating crowding.

Second Example

Figure 6:
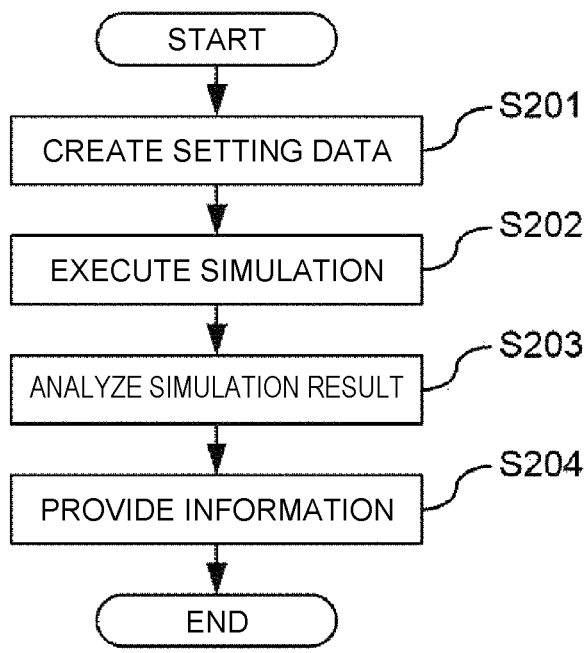
FIG. 6 is a flowchart illustrating a flow of an information provision process by the information provision device.

FIG. 6 is a flowchart illustrating a flow of an information provision process by the information provision device 10. The information provision process is performed by causing the CPU 11 to read out an information provision program from the ROM 12 or the storage 14, load the program into the RAM 13, and execute the program.

In step S201, the CPU 11 creates setting data in accordance with information related to the conditions of moving bodies measured in the past on each route (step S201). For example, the CPU 11 accumulates the number of people staying at a certain point at a certain time and the number of people passing through a certain point at a certain time acquired by position information sensors and other types of sensors with respect to pedestrians who have walked for a similar purpose in the past. Additionally, the CPU 11 uses the accumulated data regarding the number of people staying and the number of people passing through to create start times of pedestrians from multiple start points and movement routes from the multiple start points to multiple goal points such that the pedestrians meet at the certain point at the certain time as pedestrian information.

After step S201, the CPU 11 executes processes similar to steps S101 to S103 in the First Example illustrated in FIG. 5. In other words, after step S201, the CPU 11 executes a simulation using the setting data created in step S201 (step S202). After step S202, the CPU 11 analyzes the result of executing the simulation in step S202 (step S203). After step S203, the CPU 11 provides information based on the analysis result of the simulation (step S204).

By executing the series of operations illustrated in FIG. 6, the information provision device 10 is capable of executing a simulation using setting data generated on the basis of past data, and providing each pedestrian, the event organizer, or the like with information effective for alleviating crowding. In addition, the information provision device 10 may also create setting data from the most recent measured data and data obtained by augmenting past data with future measurements. Furthermore, by repeating the series of operations in FIG. 6 every time measurement proceeds, the information provision device 10 is capable of a simulation that reflects the most recent measurements in real-time. Settings regarding the starting and stopping of repetition may be included in the setting data as an overall administration setting of the information provision device 10.

Third Example

Figure 7:
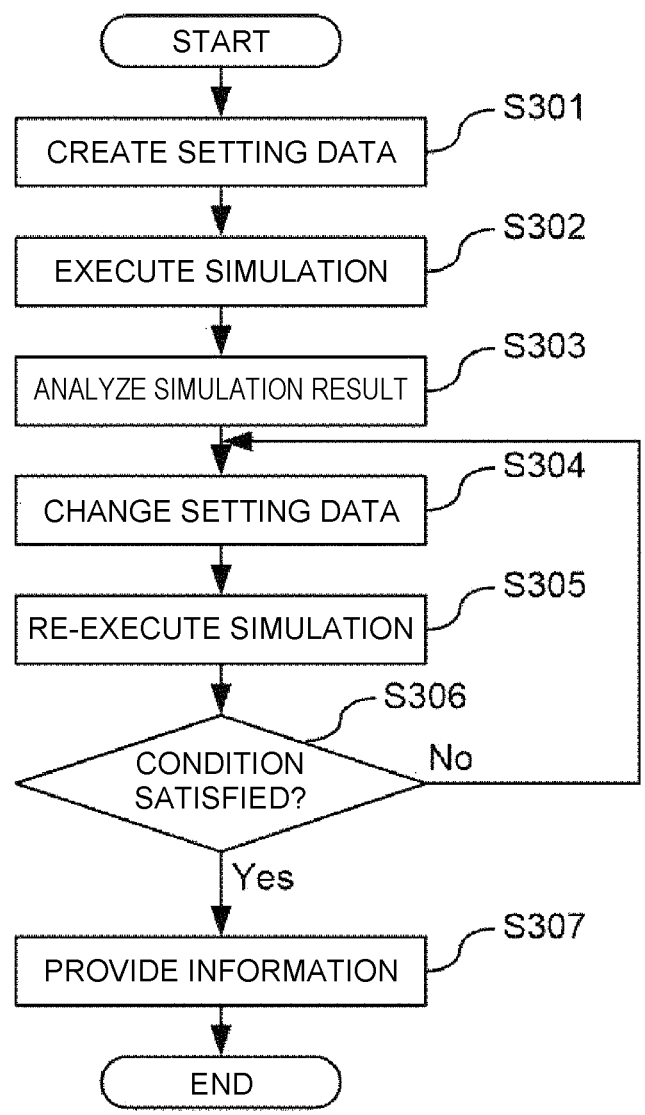
FIG. 7 is a flowchart illustrating a flow of an information provision process by the information provision device.

FIG. 7 is a flowchart illustrating a flow of an information provision process by the information provision device 10. The information provision process is performed by causing the CPU 11 to read out an information provision program from the ROM 12 or the storage 14, load the program into the RAM 13, and execute the program.

In the Third Example, in step S301 and step S302, the CPU 11 executes the same processes as step S201 and step S202 in the Second Example illustrated in FIG. 6.

After step S302, the CPU 11 analyzes the result of executing the simulation in step S302 (step S303). In the Third Example, in addition to the process of step S203 in the Second Example illustrated in FIG. 6, the CPU 11 executes a consolidation process of treating contiguous places and time periods of high population density as being under the same conditions. For example, the CPU 11 executes a process of consolidating adjacent roads from among the roads where the population density is a threshold value or higher, and also consolidating consecutive time periods on the same road where the population density is the threshold value or higher.

The CPU 11 obtains a degree of influence for the consolidated places and time periods of high population density from the scale and duration thereof. Additionally, the CPU 11 lists the places and time periods of high population density in order of the greatest degree of influence. The degree of influence may be obtained by multiplying the number of time periods during which the population density of a certain road continues to be a certain threshold value or higher by the number of consolidated roads, for example.

The CPU 11 obtains countermeasures for lowering the degree of influence in accordance with a predetermined procedure and predetermined countermeasure rules starting from the largest of the obtained degrees of influence. For example, to reduce the conditions of a high population density, the CPU 11 may obtain countermeasures for avoiding a concentration of people at a certain place and a certain time. To avoid a concentration of people at a certain place, the predetermined countermeasure rule may be to cause a predetermined ratio of people among the people at a point where the population density is a certain threshold value or higher to move to a detour route, or change the goal point to not move along a route that includes the point. Also, to avoid a concentration of people at a certain time, the predetermined countermeasure rule may be to cause a predetermined ratio of people to stand by at a place preceding a certain place, or delay the start of movement.

In step S303, the CPU 11 changes a portion of the pedestrian information 114 among the setting data of the preceding simulation to conform to the obtained countermeasures (step S304). Hereinafter, setting data that has been changed by the CPU 11 is called the proposed countermeasure setting data. The countermeasures obtained to change or limit the flow of people to avoid a concentration of people at a certain place as described above are reflected in the proposed countermeasure setting data.

After step S304, the CPU 11 re-executes the simulation using the proposed countermeasure setting data generated in step S304 (step S305).

After step S305, the CPU 11 analyzes the result of re-executing the simulation. Additionally, to check whether the effect provided by the proposed countermeasure setting data is effective or not, the CPU 11 determines whether the result of re-executing the simulation satisfies a predetermined condition (step S306). Here, the predetermined condition may be a condition such as whether the re-execution of the simulation in step S305 causes the population density to fall to a certain threshold value or below or causes the degree of influence to fall to a certain threshold value or below from the result of the simulation in step S302.

Furthermore, the pedestrian information of the proposed countermeasure setting data generated in step S304 is obtained by modifying the pedestrian information 114 of the original setting data. Consequently, from the content of the changes to the pedestrian information, it is possible to understand how the movement of pedestrians should be changed to alleviate crowding. For example, for a countermeasure that sets a detour route, it is possible to understand how the movement route for a certain number of people should be changed to pass through the detour route in only a certain time period. For a countermeasure that changes the goal point, it is possible to understand how the goal point and the route of the movement route for a certain number of people should be changed in only a certain time period to avoid using a road with higher population density. For a standby countermeasure, it is possible to understand how a certain number of people should remain in a space with a low population density and ample width and length in only a certain time period at a point preceding a road with higher population density. For a countermeasure that delays the time of departure, it is possible to understand how a certain number of people should delay starting in only a certain time period.

In the case where the population density is higher than a predetermined threshold value in multiple places and time periods, the CPU 11 repeats the generation of the proposed countermeasure setting data and the re-execution and analysis of the simulation with respect to each place and time period having a degree of influence equal to or higher than a threshold value, or with respect to each of the top N places and time periods (where N is any integer) in order of the highest degree of influence. Thereafter, the CPU 11 stores the simulation analysis result.

In the case where the result of the determination in step S306 indicates that the predetermined condition is not satisfied (step S306, No), the CPU 11 returns to step S304, re-creates the proposed countermeasure setting data, and re-executes the simulation in step S305. In the case where the result of the determination in step S306 indicates that the predetermined condition is satisfied (step S306, Yes), the CPU 11 provides information based on the simulation result (step S307). Additionally, in step S307, the CPU 11 also provides information related to the changes to the pedestrian information 114 obtained by the proposed countermeasures described above.

For example, in the case of a countermeasure that sets a detour route, the CPU 11 may provide information indicating that "if N % of the people using Road Y at Time X take a detour on Road Z, an uncongested state will be achieved". As another example, in the case of a countermeasure that changes the goal point, the CPU 11 may provide information indicating that "if N % of the people using Road Y at Time X change their goal point, an uncongested state will be achieved". Also, in the case of a standby countermeasure, the CPU 11 may provide information indicating that "if N % of the people using Road Y at Time X standby on Road Z for U minutes, an uncongested state will be achieved". Also, in the case of a countermeasure that delays the start of movement, the CPU 11 may provide information indicating that "if N % of the people using Road Y at Time X delay their start for U minutes, an uncongested state will be achieved".

As another example, the CPU 11 may also provide the state of the population density obtained from the result of the initial simulation and the state of the population density obtained from the result of the simulation adopting the countermeasures displayed beside each other on a map.

By executing the series of operations illustrated in FIG. 7 and repeating the execution of the simulation until a predetermined condition is satisfied, the information provision device 10 is capable of providing each pedestrian, the event organizer, or the like with information effective for alleviating crowding. Note that in the case where the result of the determination in step S306 above indicates that the predetermined condition is not satisfied, the flow returns to step S304, but the information provision device 10 may also set an upper limit on the number of times that the simulation may be re-executed in step S305. The CPU 11 may also add whether the number of re-executions of the simulation has reached the upper limit to the predetermined condition in step S306 in FIG. 7. Additionally, in step S307, the CPU 11 may provide information based on the simulation result within the upper limit for which the greatest reduction in the population density or the degree of influence is achieved.

Fourth Example

Figure 8:
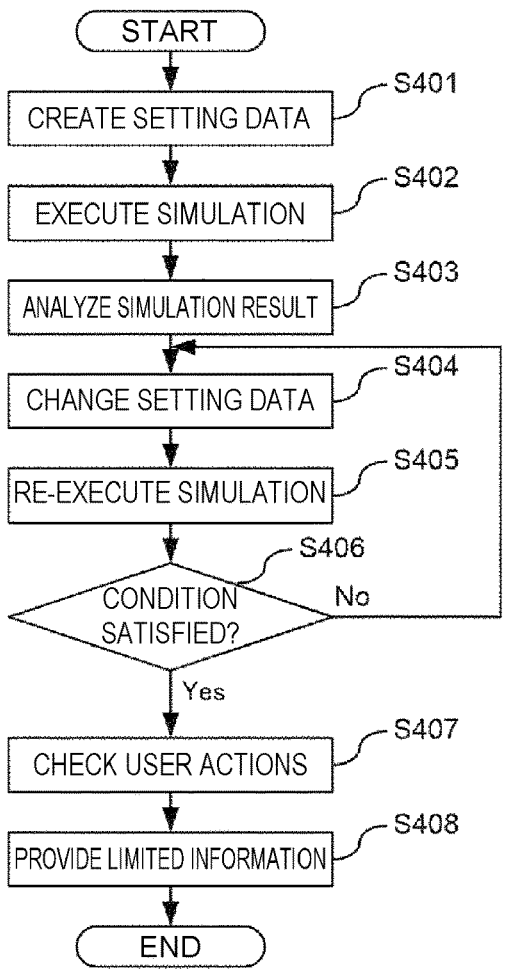
FIG. 8 is a flowchart illustrating a flow of an information provision process by the information provision device.

FIG. 8 is a flowchart illustrating a flow of an information provision process by the information provision device 10. The information provision process is performed by causing the CPU 11 to read out an information provision program from the ROM 12 or the storage 14, load the program into the RAM 13, and execute the program.

In the Fourth Example, in steps S401 to S406, the CPU 11 executes the same processes as steps S301 to S306 in the Third Example illustrated in FIG. 7.

After step S406, the CPU 11 accumulates an action history measured continuously using various types of sensors from limited users who have consented in advance to action measurement and acquisition (step S407). The sensors may be provided in a portable electronic device such as a smartphone or a smartwatch carried by each limited user, for example.

After step S407, the CPU 11 obtains users having a high likelihood of being present at times and places where crowding is predicted to occur according to the result of executing the simulation from the action history of the limited users, and provides limited information that is limited to the obtained users (step S408). As the specific limited information, the CPU 11 may provide crowding information indicating "Crowding is expected at Point Z around the time of XX:YY" as a prediction of the time and place where crowding may occur. Also, in addition to the crowding information, the CPU 11 may provide information asking for cooperation, such as "We appreciate your cooperation in helping to avoid crowding".

In addition, if a specific condition for avoiding crowding has been obtained as a result of re-executing the simulation using the proposed countermeasure setting data, the CPU 11 may provide the specific condition as the limited information. For example, the CPU 11 may provide reference information regarding a specific avoidance method, such as "You may be able to avoid crowding by waiting at the current location for XX minutes.", as information for avoiding crowding.

Additionally, the CPU 11 may assume that crowding will occur at a certain time and place, collect provision information corresponding to the time and place in advance, and provide the provision information to limited users. For example, in addition to providing the avoidance method described above, incentive information encouraging the user to avoid crowding, such as "Persons confirmed to have cooperated in avoiding this crowding will be awarded n points which can be used at the nearby shopping center".

Note that after providing the limited information in step S408, the CPU 11 may also return to checking the actions of the limited users in step S407, and by periodically checking the action history of the limited users, the CPU 11 may determine whether or not each limited user has cooperated in avoiding crowding. If the actions of a limited user at a certain time and place are determined to satisfy a condition, the CPU 11 may also provide information such as "You have received n points! Thank you for your cooperation in helping to avoid crowding." in step S407. Also, in addition to the provision of information to limited users, the CPU 11 may also cooperate with a system that provides points to provide points to limited users who have cooperated in avoiding crowding. Note that the incentive that the CPU 11 provides to the limited users is not limited to points insofar as some kind of benefit can be provided to the limited users.

By executing the series of operations illustrated in FIG. 8, the CPU 11 can assume that crowding will occur at a certain time and place, and provide various information to pedestrians attempting to pass through the place where the crowding is assumed to occur.

Figure 9:
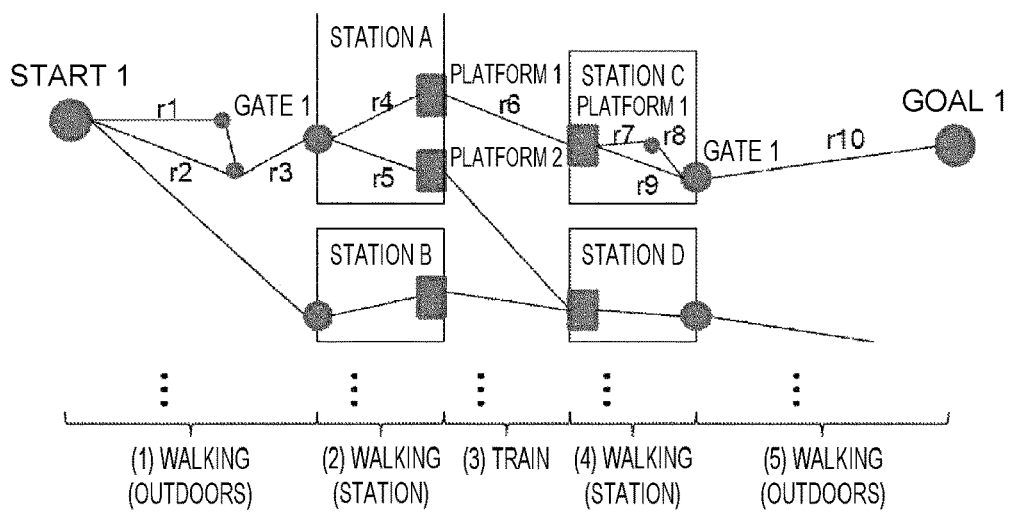
FIG. 9 is a diagram for explaining an example of considering a case of moving by using multiple means of transportation.

Next, in the present embodiment, a method of considering a case where the pedestrians acting as the moving bodies move by using multiple means of transportation will be described. FIG. 9 is a diagram for explaining an example of considering the case of moving by using multiple means of transportation.

For example, suppose that a certain pedestrian departs Start 1, arrives at Station A, moves from Gate 1 of Station A to Platform 1 and boards a train, arrives at Station C, exits Gate 1 from Platform 1 of Station C, and heads to Goal 1. In this case, the means of transportation used by the pedestrian are walking and a train, and in the case of walking, a difference in the movement conditions is observed between walking outdoors and walking inside the station. Accordingly, the information provision device 10 according to the present embodiment prepares necessary information according to the means of transportation and the differences in the movement conditions. For example, the information provision device 10 considers the case of a pedestrian moving inside a station and prepares headcount information 116 indicating the average number of people passing through a ticket gate per unit time as illustrated in FIG. 3. As another example, the information provision device 10 considers the case of moving by train and prepares train service planning diagram information 115 as illustrated in FIG. 3 as well as information regarding the average number of people able to get on and off a train.

When executing the simulation of the movement of pedestrians, the CPU 11 imposes a limit on the average number of people passing through a ticket gate per unit time in situations of entering and exiting a ticket gate, and makes getting on or off a train unavailable at times other than the times designated by the train service planning diagram. Also, when executing the simulation of the movement of pedestrians, the CPU 11 imposes a limit on the number of people able to get on and off a train to reproduce getting on and off a train depending on the degree of crowding. Also, the CPU 11 accounts for how the threshold value for determining whether or not the population density is high changes according to the means of transportation, the movement conditions, and the like, and sets respectively different threshold values. After executing the simulation, the CPU 11 can calculate the population density on each road (point) in each time period according to each means of transportation and movement condition. FIG. 10 is a diagram illustrating an outline of a population density table at each point. If the CPU 11 has obtained information like the information illustrated in FIG. 10, the CPU 11 is capable of performing an information provision process according to a method similar to the case of a single means of transportation, while considering differences in the means of transportation and the movement conditions.

Besides a method of executing a single simulation consistently from a start point to a goal point, the CPU 11 may also execute a method of performing simulations individually according to differences in the means of transportation and the movement conditions. For example, in the case of creating the population density table illustrated in FIG. 10, the CPU 11 may execute respectively independent simulations for five conditions from "(1) Walking (outdoors)" to "(5) Walking (outdoors)". Thereafter, the CPU 11 may provide a synthesis of each of the simulation results as a population density table like the one in FIG. 10. By executing simulations individually according to differences in the means of transportation and movement conditions, the CPU 11 can reduce the scale of a single simulation or execute multiple simulations in parallel. By executing simulations individually according to differences in the means of transportation and movement conditions, the CPU 11 may attain a shorter calculation time compared to the case of performing a single integrated simulation.

In the case of executing simulations individually, the CPU 11 may obtain the number of people in each time period at a point on a boundary covered by each simulation, and carry over the obtained number of people to the next simulation. For example, the CPU 11 may obtain the number of people at a point on the boundary between "(1) Walking (outdoors)" and "(2) Walking (station)" (for example, the number of people arriving at Gate 1) in each time period. Additionally, the CPU 11 may carry over the obtained number of people from the simulation of "(1) Walking (outdoors)" to the next simulation of "(2) Walking (station)".

The information provision device 10 according to the present embodiment as described above is capable of considering multiple means of transportation consistently to provide information effective for alleviating crowding. In addition, the information provision device 10 according to the present embodiment can not only provide information about the wait times until departure, but also analyze the conditions by which crowding occurs and provide information effective for alleviating crowding according to the conditions.

In the foregoing embodiment, pedestrians are given as an example of the moving bodies, but the present disclosure is not limited to such an example. For example, the information provision device 10 may also simulate the movement of vehicles as the moving bodies, and execute a process of providing information for alleviating traffic congestion. In this case, the information provision device 10 may consider the movement of vehicles on expressways and ordinary streets as the different means of transportation.

Note that the information provision process executed by causing a CPU to load software (a program) in the foregoing embodiment may also be executed by various types of processors other than a CPU. The processor in this case may be a programmable logic device (PLD) whose circuit configuration is changeable after fabrication, such as a field-programmable gate array (FPGA), or a dedicated electric circuit acting as a processor having a circuit configuration designed specifically to execute specific processes, such as an application-specific integrated circuit (ASIC), for example. Furthermore, the information provision process may be executed by one of these various types of processors or by a combination of two or more processors of the same type or different types (such as a combination of multiple FPGAs, or a CPU and an FPGA, for example). Additionally, the hardware structure of these various types of processors is more specifically an electric circuit combining circuit elements such as semiconductor elements.

Also, the foregoing embodiment describes a mode in which the information provision processing program is stored in advance (installed) in the storage 14, but the configuration is not limited thereto. The program may also be provided by being stored on a non-transitory storage medium such as a Compact Disc-Read-Only Memory (CD-ROM), a Digital Versatile Disc-Read-Only Memory (DVD-ROM), or Universal Serial Bus (USB) memory. The program may also be configured to be downloaded from an external device over a network.

Furthermore, a portion of the functional configuration of the information provision device 10 illustrated in FIG. 2 may also be distributed over a network. For example, the simulation execution unit 101 and the simulation result analysis unit 102 may be configured to be distributed into respectively separate devices.

The following supplements are further disclosed with regard to the above embodiments.

(Supplement 1)

An information provision device including:
a memory; and
at least one processor connected to the memory,
wherein
the processor is configured to
execute a simulation of a movement of moving bodies on multiple routes from a point of departure to a destination on a basis of setting data that accounts for different means of transportation,
obtain, as a simulation result, information related to a number and a density of the moving bodies on each of the routes from the point of departure to the destination on a basis of a result of executing the simulation, and
provide information based on the obtained simulation result.

(Supplement 2)

The information provision device according to Supplement 1, wherein
the processor is configured to
calculate a required time from each point to a destination in each time period by using information related to the number and density of the moving bodies.

(Supplement 3)

A non-transitory storage medium storing a computer-executable program for executing an information provision process, the process comprising:
executing a simulation of a movement of moving bodies on multiple routes from a point of departure to a destination on a basis of setting data that accounts for different means of transportation;
obtaining, as a simulation result, information related to a number and a density of the moving bodies on each of the routes from the point of departure to the destination on a basis of a result of executing the simulation; and
providing information based on the obtained simulation result.

REFERENCE SIGNS LIST

10 route traffic flow estimation device
101 simulation execution unit
102 simulation result analysis unit
103 information provision unit
104 setting data creation unit
105 action checking unit
106 limited information provision unit
111 graph
112 road system information
113 route information
114 pedestrian information
115 service planning diagram information
116 headcount information
121 movement information
122 population density table
123 population density list
124, 125 map
126, 127 required time information

The invention claimed is:

1. An information provision device comprising circuit configured to execute a method comprising:
executing a simulation of a movement of moving bodies on multiple routes from a point of departure to a destination on a basis of setting data that accounts for different means of transportation;
obtaining, as a simulation result, information related to a number and a density of the moving bodies on each of the routes from the point of departure to the destination on a basis of a result of the executing the simulation;
consolidating, based on the simulation result, adjacent roads in which a number of adjacent roads is higher than a threshold value and consecutive time periods on a same adjacent roads in which a number of consecutive time periods is higher than the threshold value;
updating setting data based on the consolidation of the adjacent roads and the consecutive time periods;
executing the simulation of the movement of moving bodies using the updated setting data, in which the simulation is executed until a predetermined condition is satisfied; and
providing the information based on the simulation result.

2. The information provision device according to claim 1, the circuit further configured to execute a method comprising:
creating setting data in accordance with information related to conditions of the moving bodies measured in the past on each of the routes, wherein
the executing the simulation executes a simulation using the setting data.

3. The information provision device according to claim 1, wherein
the obtaining, as the simulation result, the information changes the setting data for the simulation according to a predetermined countermeasure rule on a basis of the simulation result.

4. The information provision device according to claim 3, wherein
the executing the simulation re-executes the simulation using the setting data, and
the obtaining the simulation result repeatedly changes the setting data until the predetermined condition is satisfied, and causes information based on the simulation result at a time when the predetermined condition is satisfied.

5. The information provision device according to claim 4, the circuit further configured to execute a method comprising:
checking actions of limited moving bodies from among the moving bodies to be simulated; and obtaining the moving bodies having a high likelihood of being present at times and places where crowding is predicted to occur from the information related to the density of the moving bodies and a history of actions of the limited moving bodies, and provides information to the obtained moving bodies.

6. The information provision device according to claim 1, wherein
the executing the simulation executes respectively independent simulations of the movement of the moving bodies according to differences in means of transportation and movement conditions.

7. An information provision method executed by a computer, the method comprising:
executing a simulation of a movement of moving bodies on multiple routes from a point of departure to a destination on a basis of setting data that accounts for different means of transportation;
obtaining, as a simulation result, information related to a number and a density of the moving bodies on each of the routes from the point of departure to the destination on a basis of a result of executing the simulation;
consolidating, based on the simulation result, adjacent roads in which a number of adjacent roads is higher than a threshold value and consecutive time periods on a same adjacent roads in which a number of consecutive time periods is higher than the threshold value;
updating setting data based on the consolidation of the adjacent roads and the consecutive time periods:
executing the simulation of the movement of moving bodies using the updated setting data, in which the simulation is executed until a predetermined condition is satisfied; and
providing the information based on the obtained simulation result.

8. A computer-readable non-transitory storage medium storing computer-executable program instructions cause a computer system to execute a method comprising:
executing a simulation of a movement of moving bodies on multiple routes from a point of departure to a destination on a basis of setting data that accounts for different means of transportation;
obtaining, as a simulation result, information related to a number and a density of the moving bodies on each of the routes from the point of departure to the destination on a basis of a result of executing the simulation;
consolidating, based on the simulation result, adjacent roads in which a number of adjacent roads is higher than a threshold value and consecutive time periods on a same adjacent roads in which a number of consecutive time periods is higher than the threshold value:
updating setting data based on the consolidation of the adjacent roads and the consecutive time periods;
executing the simulation of the movement of moving bodies using the updated setting data, in which the simulation is executed until a predetermined condition is satisfied; and
providing the information based on the obtained simulation result.

9. The information provision device according to claim 2, wherein
the obtaining, as the simulation result, the information changes the setting data for the simulation according to a predetermined countermeasure rule on a basis of the simulation result.

10. The information provision method according to claim 7, the method further comprising:
creating setting data in accordance with information related to conditions of the moving bodies measured in the past on each of the routes, wherein
the executing the simulation executes a simulation using the setting data.

11. The information provision method according to claim 7, wherein
the obtaining, as the simulation result, the information changes the setting data for the simulation according to a predetermined countermeasure rule on a basis of the simulation result.

12. The information provision method according to claim 7, wherein
the executing the simulation executes respectively independent simulations of the movement of the moving bodies according to differences in means of transportation and movement conditions.

13. The computer-readable non-transitory storage medium according to claim 8, the computer-executable program instructions when executed further causing the computer system to execute a method comprising:
creating setting data in accordance with information related to conditions of the moving bodies measured in the past on each of the routes, wherein
the executing the simulation executes a simulation using the setting data.

14. The computer-readable non-transitory storage medium according to claim 8, wherein
the obtaining, as the simulation result, the information changes the setting data for the simulation according to a predetermined countermeasure rule on a basis of the simulation result.

15. The computer-readable non-transitory storage medium according to claim 8, wherein
the executing the simulation executes respectively independent simulations of the movement of the moving bodies according to differences in means of transportation and movement conditions.

16. The information provision method according to claim 10, wherein
the obtaining, as the simulation result, the information changes the setting data for the simulation according to a predetermined countermeasure rule on a basis of the simulation result.

17. The information provision method according to claim 11, wherein
the executing the simulation re-executes the simulation using the setting data, and
the obtaining the simulation result repeatedly changes the setting data until the predetermined condition is satisfied, and causes information based on the simulation result at a time when the predetermined condition is satisfied.

18. The computer-readable non-transitory storage medium according to claim 14, wherein
the executing the simulation re-executes the simulation using the setting data, and
the obtaining the simulation result repeatedly changes the setting data until the predetermined condition is satisfied, and causes information based on the simulation result at a time when the predetermined condition is satisfied.

19. The information provision method according to claim 17, the method further comprising:
checking actions of limited moving bodies from among the moving bodies to be simulated; and obtaining the moving bodies having a high likelihood of being present at times and places where crowding is predicted to occur from the information related to the density of the moving bodies and a history of actions of the limited moving bodies, and provides information to the obtained moving bodies.

20. The computer-readable non-transitory storage medium according to claim 18, the computer-executable program instructions when executed further causing the computer system to execute a method comprising:

checking actions of limited moving bodies from among the moving bodies to be simulated; and obtaining the moving bodies having a high likelihood of being present at times and places where crowding is predicted to occur from the information related to the density of the moving bodies and a history of actions of the limited moving bodies, and provides information to the obtained moving bodies.

\* \* \* \* \*